United States Patent
Cheng et al.

(10) Patent No.: US 10,873,377 B2
(45) Date of Patent: Dec. 22, 2020

(54) DEVICE, NETWORK, AND METHOD FOR RECEIVING DATA TRANSMISSION UNDER SCHEDULING DECODING DELAY IN MMWAVE COMMUNICATION

(71) Applicant: Futurewei Technologies, Inc., Plano, TX (US)

(72) Inventors: Qian Cheng, Aurora, IL (US); Weimin Xiao, Hoffman Estates, IL (US); Jialing Liu, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/103,848

(22) Filed: Aug. 14, 2018

(65) Prior Publication Data

US 2019/0044595 A1 Feb. 7, 2019

Related U.S. Application Data

(63) Continuation of application No. 15/140,088, filed on Apr. 27, 2016, now Pat. No. 10,193,604.

(Continued)

(51) Int. Cl.
    *H04W 72/04* (2009.01)
    *H04B 7/06* (2006.01)
    *H04B 7/0417* (2017.01)

(52) U.S. Cl.
    CPC ......... *H04B 7/0617* (2013.01); *H04B 7/0417* (2013.01)

(58) Field of Classification Search
    CPC .. H04B 7/0617; H04B 7/0417; H04B 7/0868; H04W 72/04; H04W 72/042
    See application file for complete search history.

(56) References Cited

U.S. PATENT DOCUMENTS 10,003,446 B2 * 6/2018 Yu .................. H04B 7/0617
2009/0023451 A1 1/2009 Pan et al.
(Continued)

FOREIGN PATENT DOCUMENTS

| CN | 101755392 A | 6/2010 |
| CN | 101779387 A | 7/2010 |

(Continued)

OTHER PUBLICATIONS

Wonil Roh:Millimeter-Wave Beamforming as an Enabling Technology for 5G Cellular Communications: Theoretical Feasibility and Prototype Results, IEEE Communications Magazine • Feb. 2014. pp. 106-113.

*Primary Examiner* — Lan-Huong Truong
(74) *Attorney, Agent, or Firm* — Slater Matsil, LLP

(57) ABSTRACT

In a first example embodiment, a control transmission portion of a mmWave communication is received at a user equipment. The control transmission portion is divided into a plurality of control transmission portion sub-regions, each sub-region scheduling a data transmission for a corresponding sub-region of a data transmission portion of the mmWave communication. Then a first of the control transmission portion sub-regions is demodulated and decoded. A receive analog antenna beamforming is armed according to the demodulated and decoded first of the control transmission portion sub-regions. Beamforming is performed on a first sub-region of the data transmission portion of the mmWave communication, the first sub-region of the data transmission portion corresponding to the first of the control transmission portion sub-regions. During the arming and performing, a second of the control transmission portion sub-regions is demodulated and decoded.

12 Claims, 13 Drawing Sheets

Related U.S. Application Data

(60) Provisional application No. 62/155,961, filed on May 1, 2015.

(56) References Cited

U.S. PATENT DOCUMENTS

| | | | |
|---|---|---|---|
| 2009/0046582 A1 | 2/2009 | Sarkar et al. | |
| 2010/0323684 A1 | 12/2010 | Cai et al. | |
| 2011/0305228 A1 | 12/2011 | Cordeiro | |
| 2012/0033643 A1* | 2/2012 | Noh | H04L 5/0048 370/335 |
| 2013/0017836 A1* | 1/2013 | Chang | H01Q 1/1257 455/452.1 |
| 2013/0148644 A1 | 6/2013 | Suh et al. | |
| 2013/0188624 A1* | 7/2013 | Lee | H04W 24/02 370/338 |
| 2013/0194956 A1 | 8/2013 | Sartori et al. | |
| 2013/0272220 A1* | 10/2013 | Li | H04W 72/046 370/329 |
| 2013/0286960 A1* | 10/2013 | Li | H04W 72/042 370/329 |
| 2013/0315113 A1 | 11/2013 | Seo et al. | |
| 2014/0192759 A1 | 7/2014 | Son et al. | |
| 2014/0254542 A1 | 9/2014 | Liu et al. | |
| 2015/0009968 A1 | 1/2015 | Yu et al. | |
| 2015/0071194 A1 | 3/2015 | Kim et al. | |
| 2015/0071248 A1 | 3/2015 | Faerber et al. | |
| 2015/0085776 A1 | 3/2015 | Morioka | |
| 2015/0223088 A1 | 8/2015 | Niu et al. | |
| 2015/0257073 A1* | 9/2015 | Park | H04B 7/0408 370/331 |
| 2015/0304017 A1 | 10/2015 | Zhuang et al. | |
| 2016/0072562 A1 | 3/2016 | Onggosanusi et al. | |
| 2016/0323859 A1 | 11/2016 | Liu et al. | |
| 2018/0270035 A1 | 9/2018 | Yu et al. | |

FOREIGN PATENT DOCUMENTS

| | | | |
|---|---|---|---|
| CN | 101924610 A | 12/2010 | |
| CN | 102217212 A | 10/2011 | |
| CN | 102461010 A | 5/2012 | |
| CN | 103107872 A | 5/2013 | |
| CN | 103200684 A | 7/2013 | |
| CN | 103931153 A | 7/2014 | |
| CN | 104322128 A | 1/2015 | |
| KR | 20140142696 A | 12/2014 | |
| KR | 20150006381 A | 1/2015 | |
| WO | 2011001697 A1 | 1/2011 | |
| WO | 2014098542 A1 | 6/2014 | |
| WO | 2014112757 A1 | 7/2014 | |
| WO | 2014124164 A1 | 8/2014 | |
| WO | WO-2014124164 A1 * | 8/2014 | H04L 5/0053 |
| WO | 2014176204 A1 | 10/2014 | |
| WO | 2015005641 A1 | 1/2015 | |

* cited by examiner

DEVICE, NETWORK, AND METHOD FOR RECEIVING DATA TRANSMISSION UNDER SCHEDULING DECODING DELAY IN MMWAVE COMMUNICATION

CROSS-REFERENCE TO RELATED APPLICATION

This application is a continuation of U.S. patent application Ser. No. 15/140,088, filed on Apr. 27, 2016 The application Ser. No. 15/140,088 claims the benefit of priority of U.S. Provisional Patent Application Ser. No. 62/155,961, filed on May 1, 2015, the benefit of priority of which is claimed hereby, and which is incorporated by reference herein in its entirety.

TECHNICAL FIELD

The present disclosure relates to a device, network, and method for wireless communications, and, in particular embodiments, to a device and method for receiving data transmission under scheduling decoding delay in mmWave communication.

BACKGROUND

The amount of wireless data utilized in mobile networks has increased dramatically in the last few years, pushing the capacity of current macro cellular deployments. Cellular communications systems, which utilize microwave spectrum bands (300 MHz to 3 GHz), are becoming capacity-limited due to interference and traffic load. The use of high frequency bands (e.g., 28, 38, 60 and 73 GHz), where vast amounts of bandwidth is available, is considered to be a crucial technology for future generation communication systems. The use of these high frequency bands can mitigate the problem of capacity currently observed.

SUMMARY

Various methods and systems are provided to provide for receiving a millimeter wave (mmWave) communication using various delaying techniques to ensure best possible beamforming from the mmWave communication.

In a first example embodiment, a method for receiving a mmWave communication is provided. A control transmission portion of the mmWave communication is received at a user equipment. The control transmission portion is divided into a plurality of control transmission portion sub-regions, each sub-region scheduling a data transmission for a corresponding sub-region of a data transmission portion of the mmWave communication. Then a first of the control transmission portion sub-regions is demodulated and decoded. A receive analog antenna beamforming is armed according to the demodulated and decoded first of the control transmission portion sub-regions. Beamforming is performed on a first sub-region of the data transmission portion of the mmWave communication, the first sub-region of the data transmission portion corresponding to the first of the control transmission portion sub-regions. During the arming and performing, a second of the control transmission portion sub-regions is demodulated and decoded. After beamforming on the first sub-region of the data transmission portion of the mmWave communication is completed, a receive analog antenna beamforming is armed according to the demodulated and decoded second of the control transmission portion sub-regions, and beamforming is performed on a second sub-region of the data transmission portion of the mmWave communication, the second sub-region of the data transmission portion corresponding to the second of the control transmission portion sub-regions.

In a second example embodiment, another method for receiving a millimeter wave (mmWave) communication is provided. A control transmission portion of the mmWave communication is received at a user equipment (UE). Scheduling restrictions are assigned to an earlier portion of the control transmission portion of the mmWave communication. Demodulation and decoding of the earlier portion of the control transmission portion are performed. Prior to completion of the demodulation and decoding, an earlier portion of a data transmission portion of the mmWave communication is received, the earlier portion of the data transmission portion of the mmWave communication corresponding to the earlier portion of the control transmission portion of the mmWave communication. Beamforming is then performed on the earlier portion of the data transmission portion of the mmWave communication using default parameters. Demodulation and decoding of a later portion of the control transmission portion are performed. Then, beamforming of the later portion of the data transmission portion of the mmWave communication is performed using parameters obtained during the performing of demodulation and decoding of the later portion of the control transmission portion.

BRIEF DESCRIPTION OF THE DRAWINGS

For a more complete understanding of the present inventive subject matter and the benefits thereof, reference is now made to the following descriptions taken in conjunction with the accompanying drawings, in which.

DETAILED DESCRIPTION

In the following description, reference is made to the accompanying drawings, which form a part hereof, and in which are shown, by way of illustration, specific embodiments which may be practiced. These embodiments are described in sufficient detail to enable those skilled in the art to practice the subject matter disclosed herein, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software or a combination of software and human-implemented procedures in one embodiment. The software may consist of computer-executable instructions stored on computer-readable media or a computer-readable storage device such as one or more non-transitory memories or other types of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, application-specific integrated circuit (ASIC), microprocessor, or other type of processor operating on a computer system, such as a personal computer, server, or other computer system.

Propagation in the millimeter band (mmWave) is much more challenging than in the microwave band, resulting in a more stringent link budget at mmWave band than at microwave band. Equipping transmitters and receivers with a larger number of antenna arrays is a viable solution to compensate for the mmWave extra path loss by beamforming.

Since antenna size is inversely proportional to the carrier frequency, the use of these high frequency bands reduces the antenna size considerably. This opens the door to employing a larger number of transmit and receive antenna arrays at both network and terminal sides.

Hybrid antenna architecture is likely to be used to trade off hardware complexity, power consumption, and the performance and coverage of the system. Hybrid antenna architecture typically includes analog (phase shifter) and digital (baseband pre-coder) beamforming parts.

A base station may include one or more Radio Frequency (RF) chains, and each RF chain is connected to analog phase shifters and antenna arrays. A UE receiver may include one or more RF chains connected to receiver analog phase shifters and an antenna array.

Figure 1:
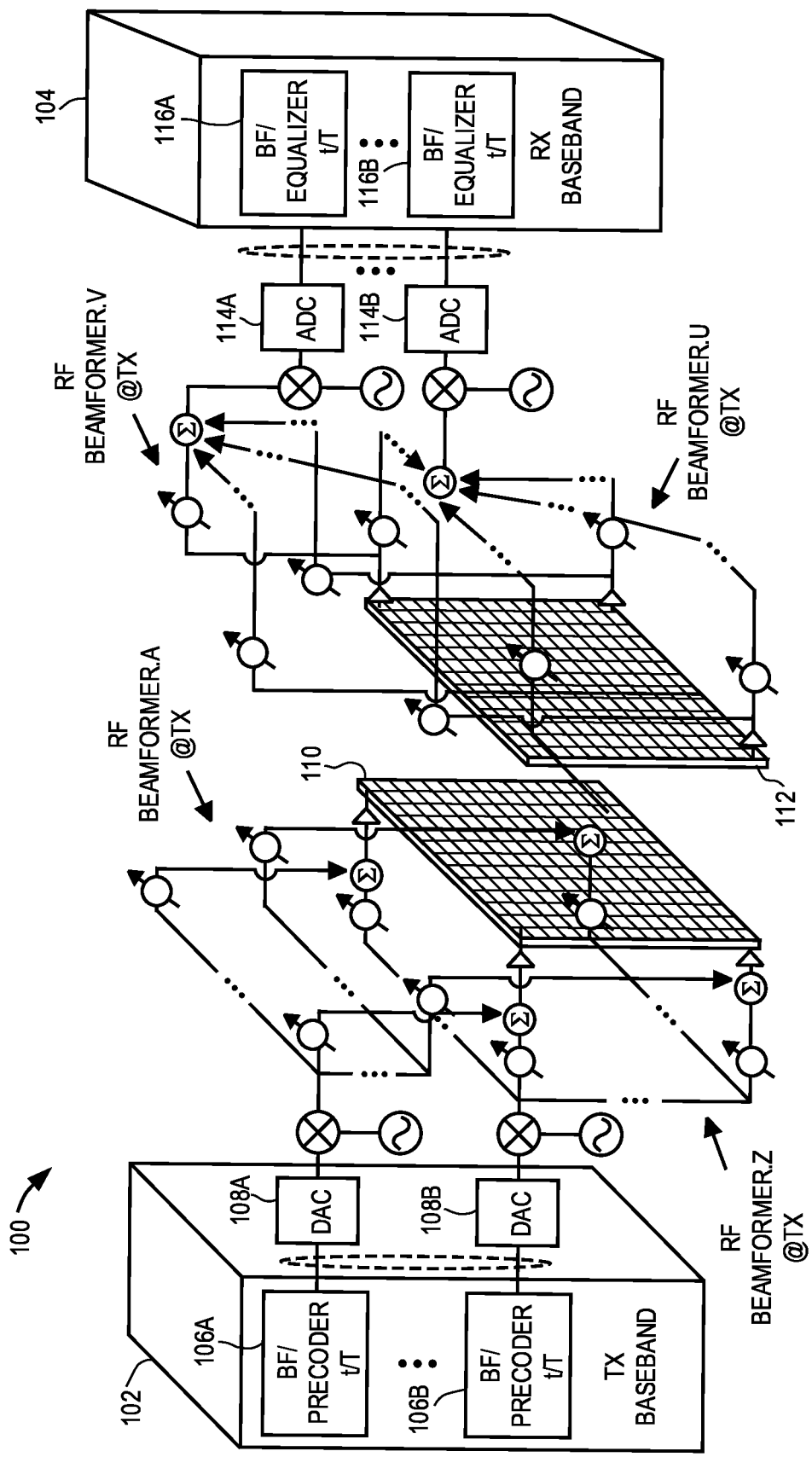
FIG. 1 shows an example of one hybrid beamforming architecture with a shared array.

There are different types of analog beamforming architectures: shared array and sub-array. FIG. 1 shows an example of one hybrid beamforming architecture 100 with a shared array. The architecture 100 includes a baseband beamforming transmitter 102 and a baseband beamforming receiver 104. In one example embodiment the baseband beamforming transmitter 102 may be implemented as a baseband beamforming transmission means. In another example embodiment, the baseband beamforming receiver 104 may be implemented as a baseband beamforming receiving means. The baseband beamforming transmitter 102 includes a plurality of precoders 106A-106B. The precoders 106A-106B act to exploit transmit diversity by weighting information streams. In an example embodiment, each of the precoders 106A-106B may be implemented as a precoding means. Digital-to-Analog converters (DACs) 108A, 108B then act to convert the precoded digital signals to analog signals to send to the transmitter shared array 110. In an example embodiment, each of the DACs 108A, 108B may be implemented as a digital-to-analog conversion means. In another example embodiment, the transmitter shared array 110 may be implemented as a transmitter shared array means. A receiver shared array 112 then receives the transmitted signal and one or more analog-to-digital converters (ADCs) 114A, 114B convert the received signal to digital. In an example embodiment, the receiver shared array 112 may be implemented as a receiver shared array means. In another example embodiment, each of the ADCs 114A, 114B may be implemented as an analog-to-digital conversion means. Finally, one or more equalizers 116A, 116B to equalize the digital signals. In an example embodiment, each of the equalizers 116A, 116B may be implemented as an equalization means.

Figure 2:
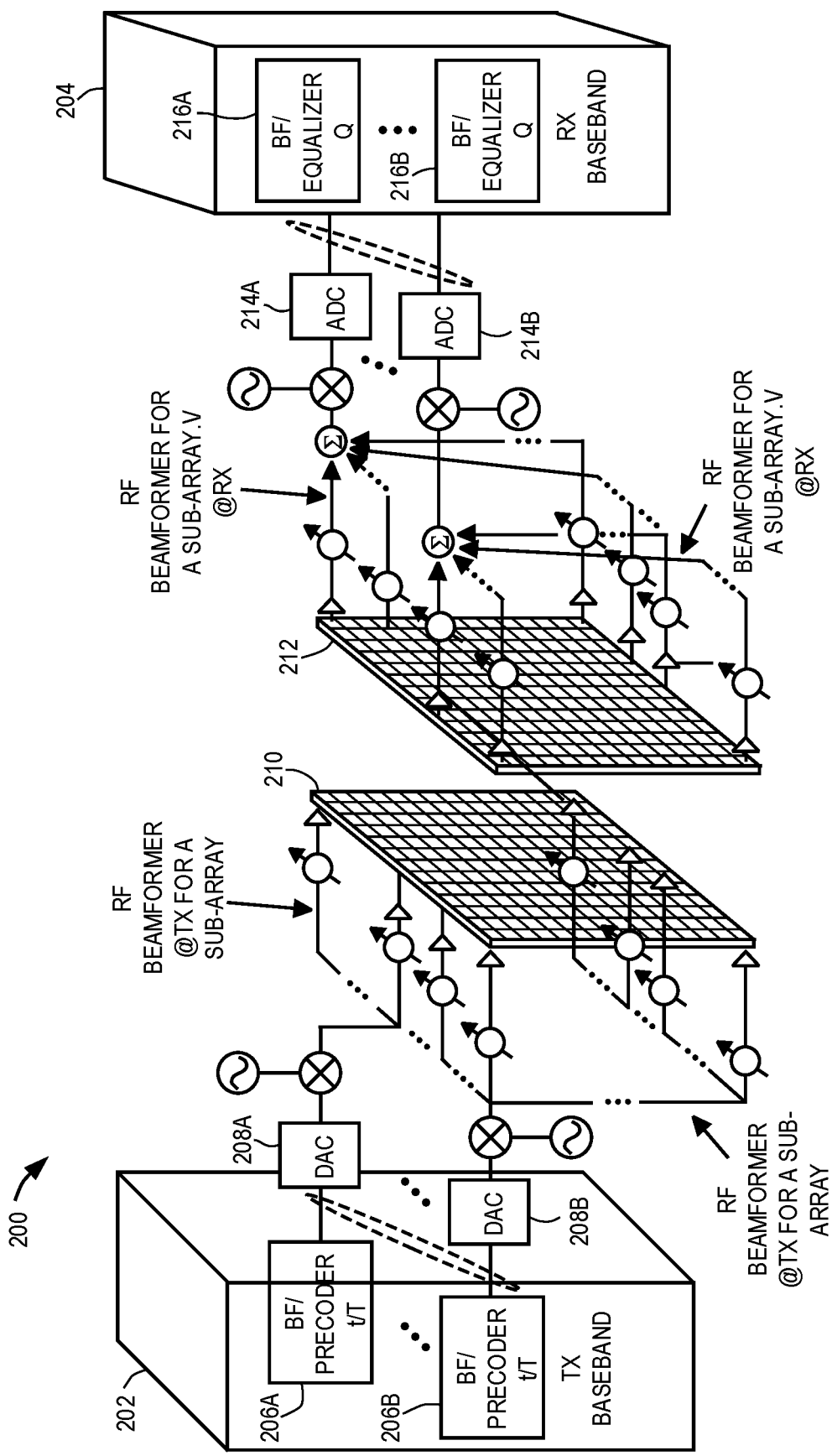
FIG. 2 shows an example of another hybrid beamforming architecture with a sub-array.

FIG. 2 shows an example of another hybrid beamforming architecture 200 with a sub-array. This architecture 200 provides a lower complexity version of the hybrid beamforming architecture 100 of FIG. 1 by reducing the number of phase shifters and omitting the need for RF combiners on the transmission side. However, the rest of the architecture 200 is the same as the shared hybrid beamforming architecture 100 of FIG. 1. The architecture 200 includes a baseband beamforming transmitter 202 and a baseband beamforming receiver 204. In one example embodiment the baseband beamforming transmitter 202 may be implemented as a baseband beamforming transmission means. In another example embodiment, the baseband beamforming receiver 204 may be implemented as a baseband beamforming receiving means. The baseband beamforming transmitter 202 includes a plurality of precoders 206A-206B. The precoders 206A-206B act to exploit transmit diversity by weighting information streams. In an example embodiment, each of the precoders 206A-206B may be implemented as a precoding means. Digital-to-Analog converters (DACs) 208A, 208B then act to convert the precoded digital signals to analog signals to send to the transmitter sub-array 210. In an example embodiment, each of the DACs 208A, 208B may be implemented as a digital-to-analog conversion means. In another example embodiment, the transmitter sub-array 210 may be implemented as a transmitter shared array means. A receiver sub-array 212 then receives the transmitted signal and one or more analog-to-digital converters (ADCs) 214A, 214B convert the received signal to digital. In an example embodiment, the receiver sub-array 212 may be implemented as a receiver sub-array means. In another example embodiment, each of the ADCs 214A, 214B may be implemented as an analog-to-digital conversion means. Finally, one or more equalizers 216A, 216B equalize the digital signals. In an example embodiment, each of the equalizers 216A, 216B may be implemented as an equalization means.

Figure 3:
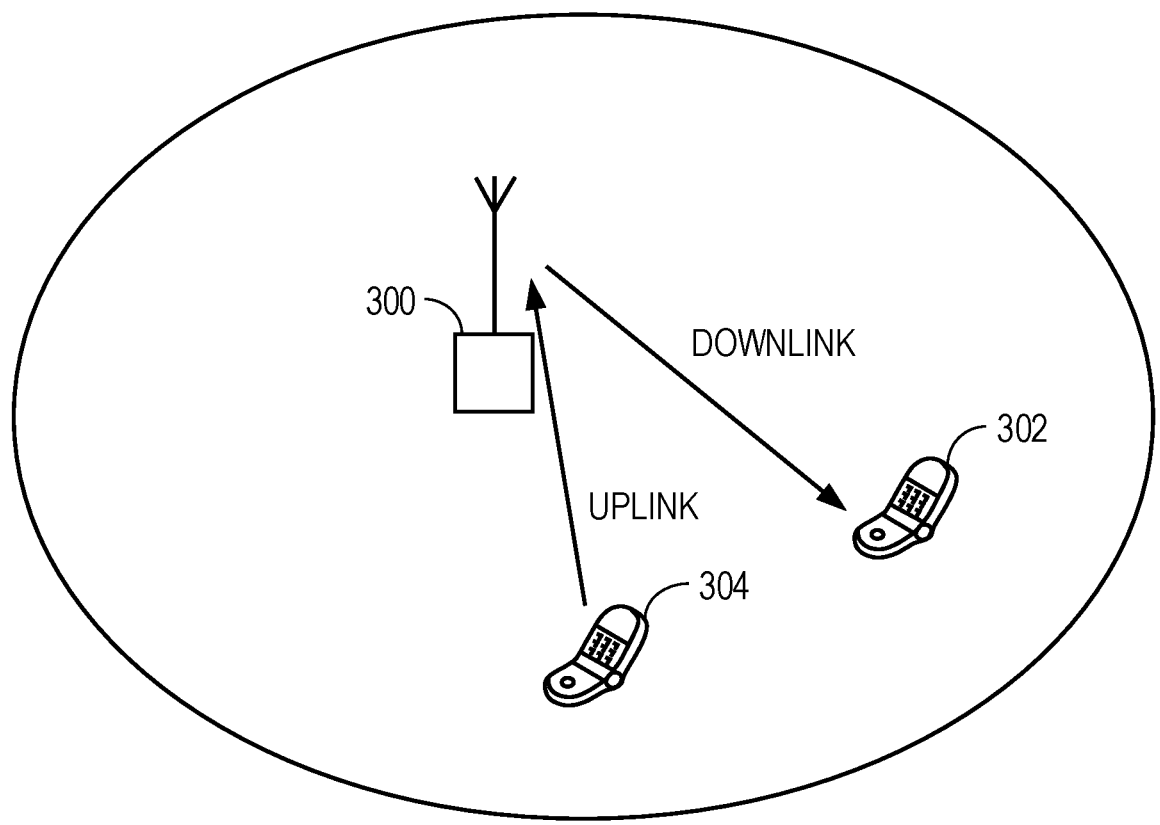
FIG. 3 depicts how the transmission/reception from controller to a UE is called downlink (DL) transmission/reception, and the transmission/reception from a UE to a controller is called uplink (UL) transmission/reception.

FIG. 3 depicts how the transmission/reception from controller 300 to a UE 302 is called downlink (DL) transmission/reception, and the transmission/reception from a UE 304 to a controller 300 is called uplink (UL) transmission/reception.

In a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UE), mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

In Orthogonal frequency-division multiplexing (OFDM) systems, the frequency bandwidth is divided into multiple subcarriers in the frequency domain. In the time domain, one subframe is divided into multiple OFDM symbols. The OFDM symbol may have a cyclic prefix to avoid inter-symbol interference due to multiple path delays. One resource element (RE) is defined by the time-frequency resource within one subcarrier and one OFDM symbol. A reference signal and other signals, such as data channel, e.g. physical downlink shared channel (PDSCH), and control channel, e.g. physical downlink control channel (PDCCH), are orthogonal and multiplexed in different resource elements in the time-frequency domain. Further, the signals are modulated and mapped into resource elements. Using inverse Fourier transform per each OFDM symbol, the signals in the frequency domain are transformed into the signals in the time domain, and are transmitted with added cyclic prefix to avoid the inter-symbol interference.

Figure 4:
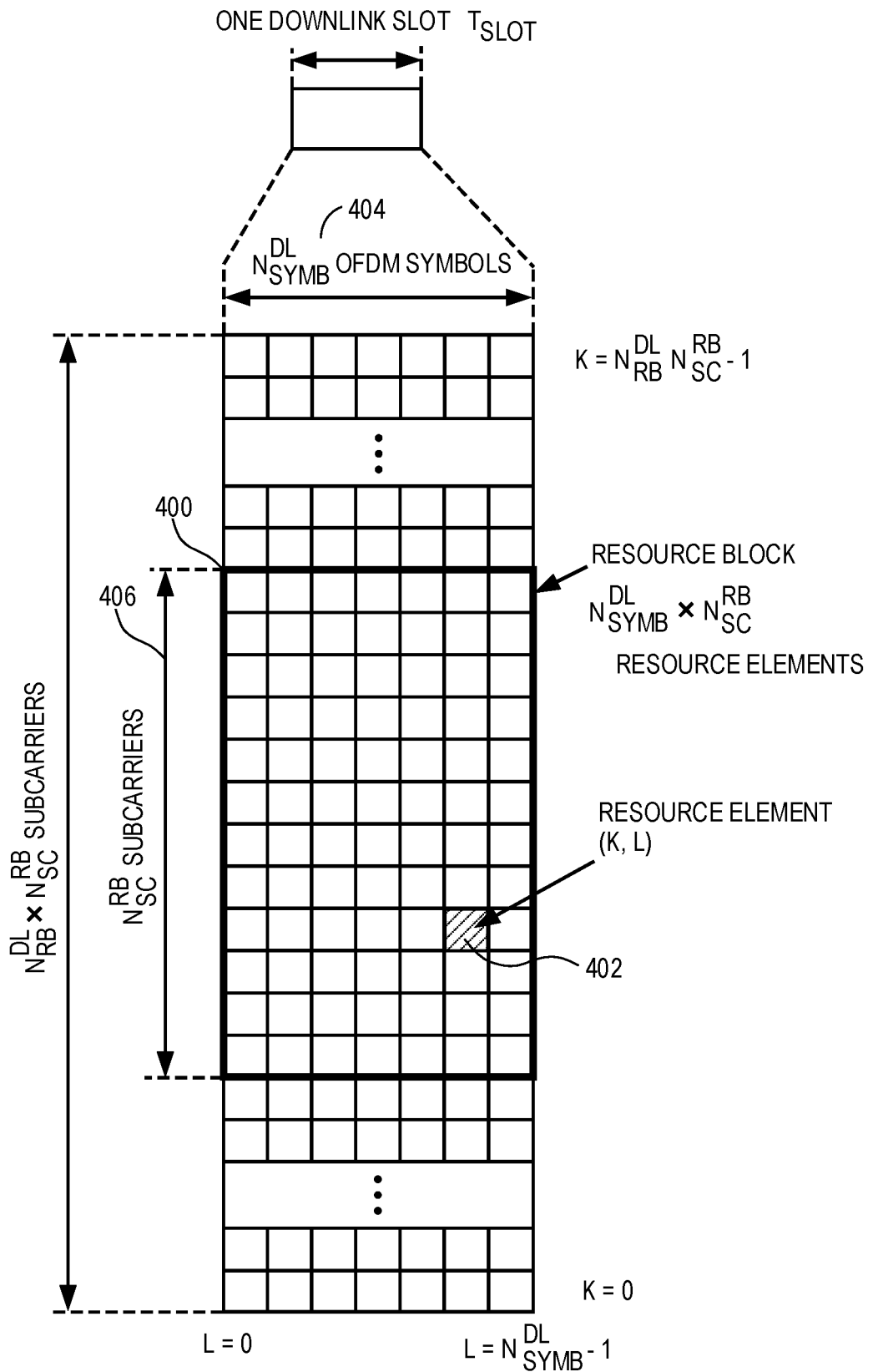
FIG. 4 is a diagram illustrating an example resource block in accordance with an example embodiment.

Each resource block (RB) contains a number of REs. FIG. 4 is a diagram illustrating an example resource block 400 in accordance with an example embodiment. The resource block 400 comprises a number of different resource elements, such as resource element 402. For each resource block 400, there are 14 OFDM symbols labeled from 0 to 13 in each subframe. The symbols 0 to 6 in each subframe correspond to even slots, and the symbols 7 to 13 in each subframe correspond to odd slots. In the figure, only seven OFBM symbols across are shown (404). There are also 12 subcarriers (406) in each resource block 400, and hence in this example, there are 132 REs in a RB. In each subframe, there are a number of RBs, and the number may depend on the bandwidth (BW).

Figure 5:
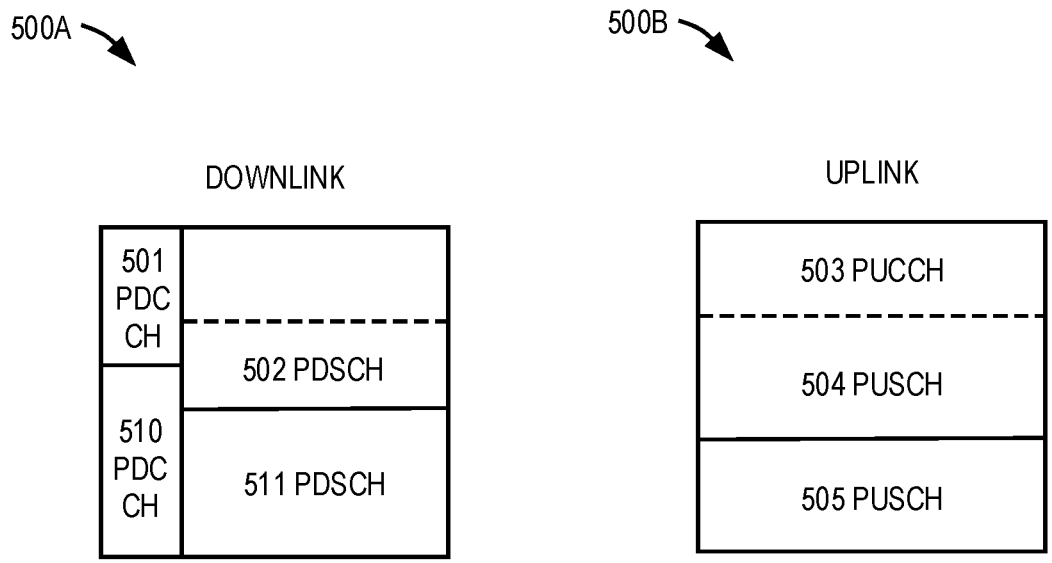
FIG. 5 is a diagram showing example data packets in accordance with an example embodiment.

FIG. 5 is a diagram showing example data packets 500A, 500B in accordance with an example embodiment. The data channels transmitting data packets 500A from eNB to UEs in the physical layer are called physical downlink shared channel (PDSCH) 502 and 511, and the data channel transmitting data packet 500B from UEs to eNB in the physical layer are called physical uplink shared channel (PUSCH) 504 and 505. The corresponding physical control channels, transmitted from eNB to UEs, indicate where the corresponding PDSCH 502 and 511 and/or PUSCH 504 and 505 are in the frequency domain and in which manner the PDSCH 502 and 511 and/or PUSCH 504 and 505 is transmitted, which are called physical downlink control channel (PDCCH) 502, 503, and 505. In FIG. 5, PDCCH 501 may indicate the signaling for PDSCH 502 or PUSCH 504.

UEs measure the channel status, especially for multiple antennas cases. PMI/CQI/RI and other feedbacks may be based on the measurement of reference signal. PMI is the precoding matrix indicator, CQI is the channel quality indicator, and RI is the rank indicator of the precoding matrix. There may be multiple reference signal resources configured for a UE. There is specific time-frequency resource and scrambling code assigned by the eNB for each reference signal resource.

Usually, the eNBs may be arranged close to each other so that a decision made by a first eNB may have an impact on a second eNB. For example, the eNBs may use their transmit antenna arrays to form beams towards their UEs when serving them. This may mean that if the first eNB decides to serve a first UE in a particular time-frequency resource, it may form a beam pointing to that UE. However, the pointed beam may extend into a coverage area of the second eNB and cause interference to UEs served by the second eNB. The inter-cell interference (ICI) for small cell wireless communications systems is commonly referred to as an interference limited cell scenario, which may be different from a noise limited cell scenario seen in large cell wireless communications systems.

In an example embodiment, an eNodeB may control one or more cells. Multiple remote radio units may be connected to the same base band unit of the eNodeB by fiber cable, and the latency between the baseband unit and the remote radio unit is quite small. Therefore the same baseband unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of PDSCH transmitted in different cells for the UE can be easily coordinated in the same eNodeB.

In a typical system design such as LTE, the PDCCH channel containing the control information, which is used for receiving the data transmission, is transmitted first and followed immediately by the corresponding data transmission. Upon receiving the PDCCH signal, the UE starts the baseband processing of the control signal, i.e., demodulation and decoding of the control message. Since the baseband processing takes some time to finish, the UE has to receive the data transmission signal before the control signal processing is done. This is not an issue for typical low frequency band systems since the UE buffers the received signal anyway.

The control message decoding delay imposes a serious problem on the mmWave system design due to the large path loss characteristic of the high frequency band. In order to properly receive the data signal, the UE needs to apply the correct analog receive beamforming, which is matched to analog transmit beamforming employed at the eNodeB transmitter. Once the control message is decoded, the information about the scheduled data transmission is available, e.g., rank, PMI, etc., and the UE can then figure out the analog transmit beam(s) corresponding to the data transmission and apply the matching analog receive beamforming to receive the signal. However, due to the control message decoding delay, in mmWave communication, the UE is unable to apply analog receive beamforming matched to the transmit beamforming before the data signal reception starts. Even if the UE buffer has the received signal, the signal will be useless because of analog transmit and receive beamforming mismatch until the decoding results of the control message becomes available. Only then can the UE apply the matching analog receive beamforming according to the decoded results of the control message.

Figure 6:
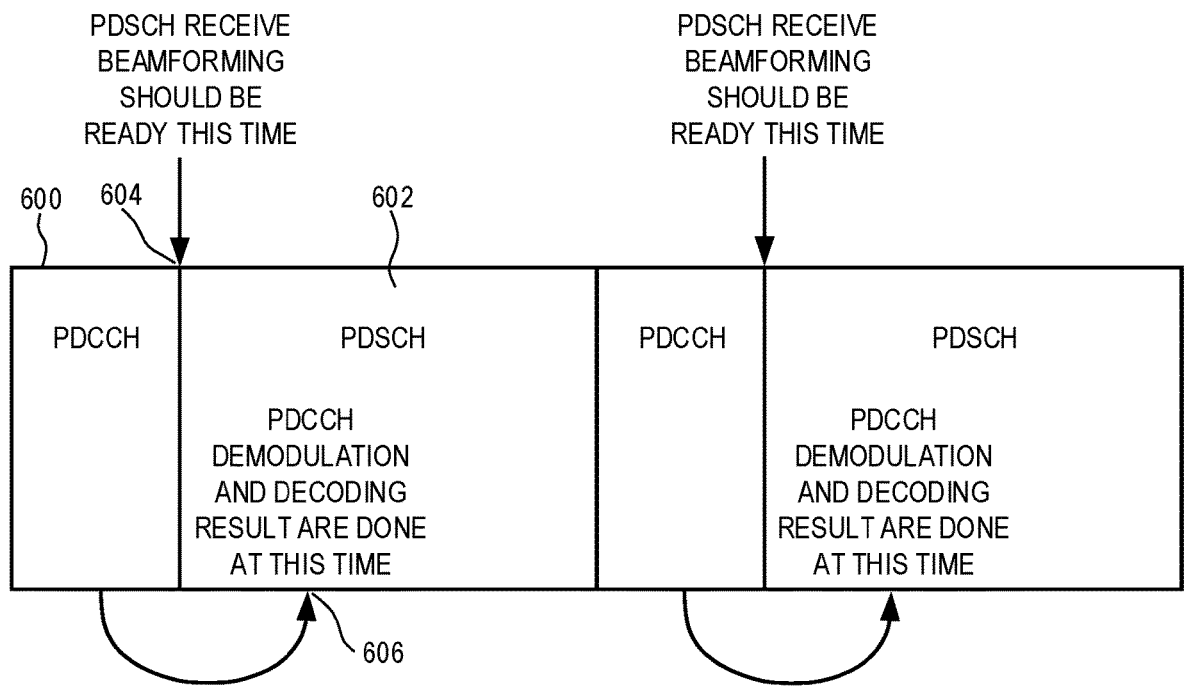
FIG. 6 is a diagram depicting a control transmission region (e.g., PDCCH) and a data transmission region (e.g., PDSCH) in accordance with an example embodiment.

FIG. 6 is a diagram depicting a control transmission region (e.g., PDCCH) and a data transmission region (e.g., PDSCH) in accordance with an example embodiment. As can be seen, the control transmission region 600 is received first, followed by the data transmission region 602. PDSCH receive beamforming may be ready at time 604, but the PDCCH demodulation and decoding results are not ready until time 606.

In an example embodiment, a device and method are provided that divide the control transmission region 600 (e.g., PDCCH) and data transmission region 602 (e.g., PDSCH) into sub-regions. Each control sub-region schedules the data transmission for the corresponding data transmission sub-region. Since a gap is introduced between the transmissions of control message and scheduled data, the UE can finish decoding the control message and apply the matching analog receive beamforming before the start of corresponding data transmission reception. In other words, the UE can arm its receive analog beamforming according to the corresponding control sub-region decoding results to receive the data sub-region transmission thanks to the delay gap introduced between scheduling and transmission of a corresponding sub-region.

Figure 7:
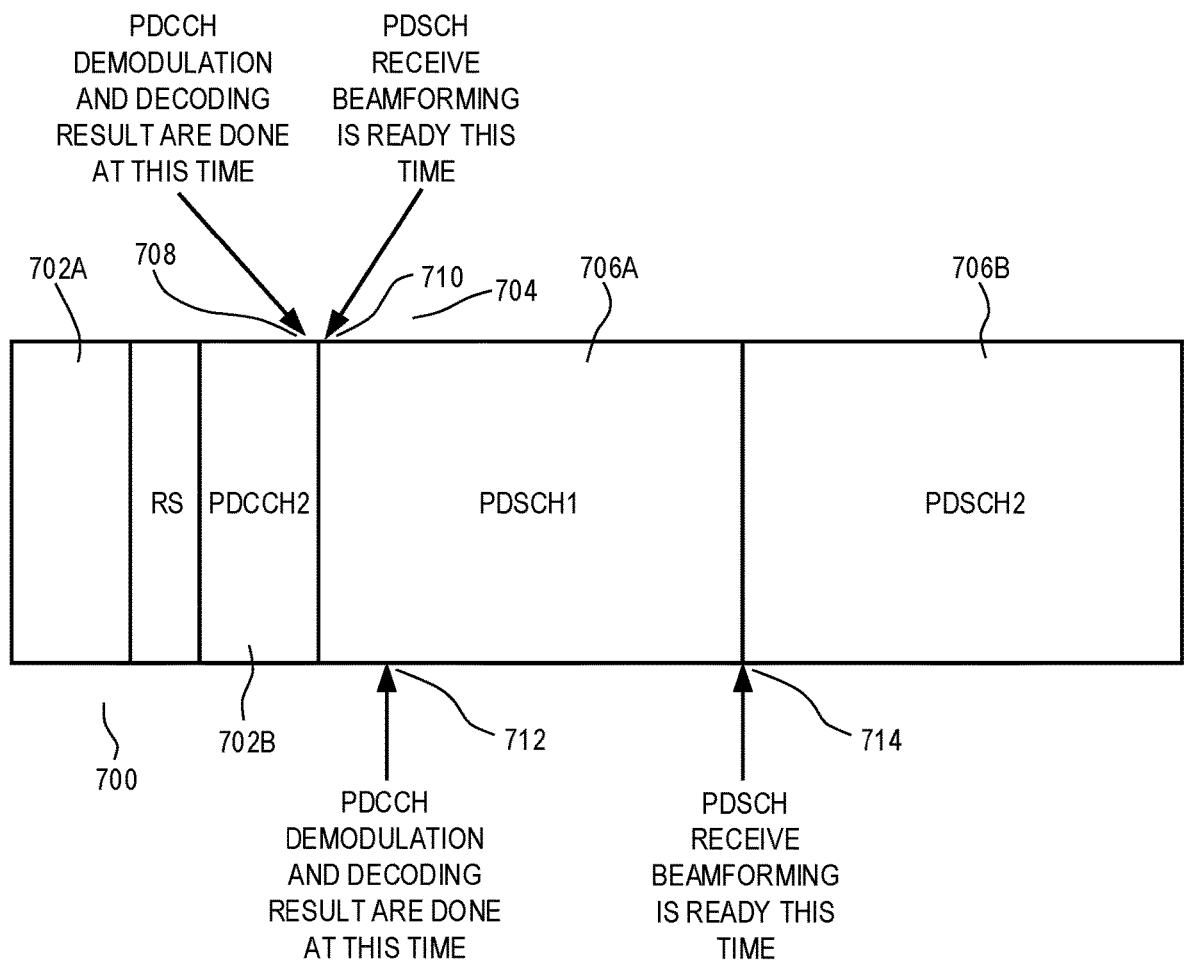
FIG. 7 is a diagram depicting a divided control transmission region and divided data transmission region in accordance with an example embodiment.

FIG. 7 is a diagram depicting a divided control transmission region and divided data transmission region in accordance with an example embodiment. Here, the control transmission region 700 has been divided into sub-region 702A and sub-region 702B, while data transmission region 704 has been divided into sub-region 706A and sub-region 706B. As such, the system is able to demodulate and decode sub-region 702A at time 708, before the data transmission region sub-region 706A receive beamforming is ready at time 710. Likewise, the system is able to demodulate and decode sub-region 702B at time 712, before the data transmission region sub-region 706B receive beamforming is ready at time 714.

In an alternative example embodiment, a device and method are provided that impose a scheduling restriction on the data transmission starting from the beginning of the data transmission timeline. The UEs to be scheduled data transmission in this scenario apply default analog receive beamforming for data signal reception, e.g., analog transmit beamforming corresponding to the UE's latest reporting commendations including rank, PMI, analog transmit beamforming, etc. Correspondingly, the network also applies default analog transmit beamforming, rank, and PMI in the data transmission for these specific scheduled UEs.

Figure 8:
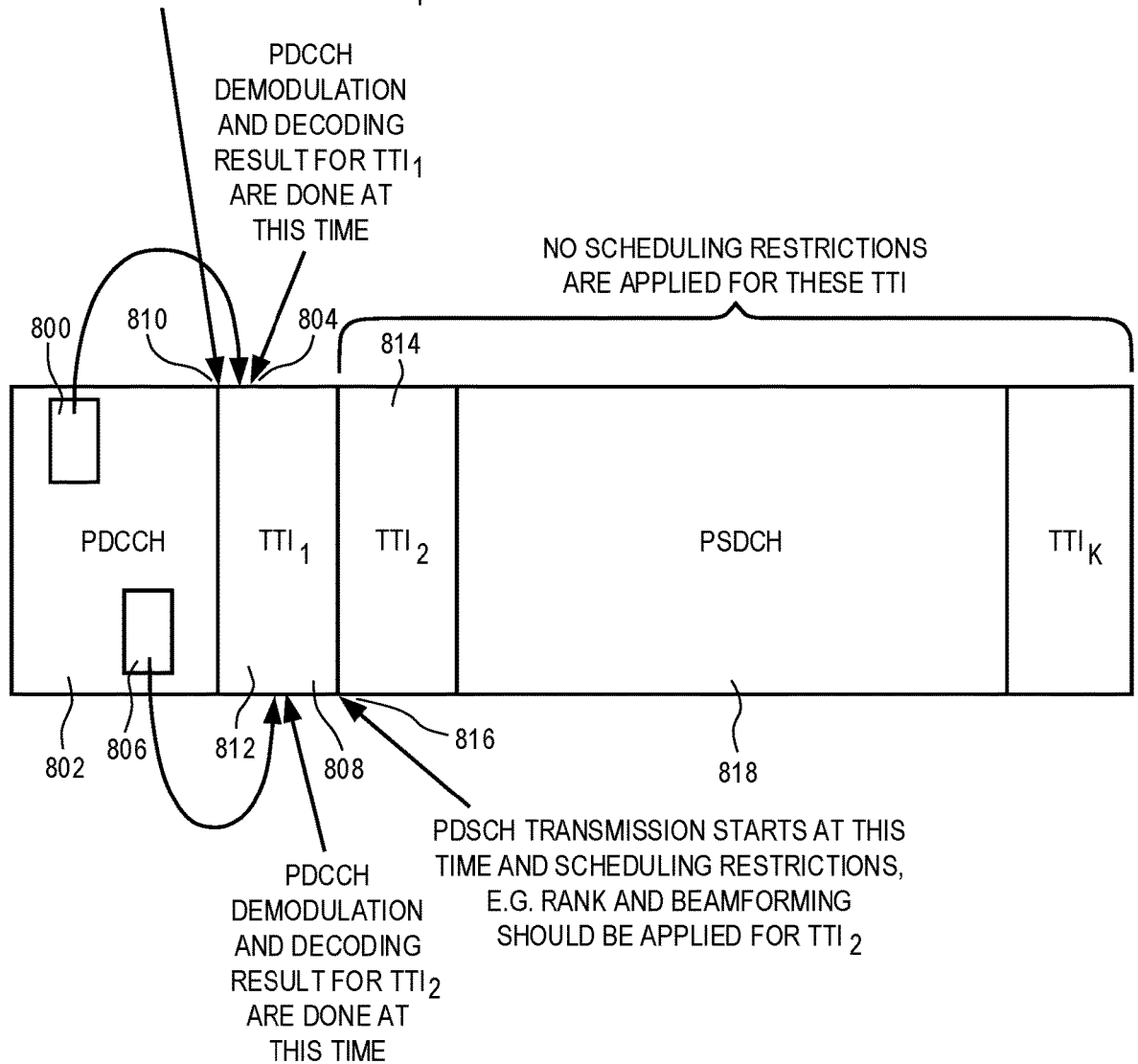
FIG. 8 is a diagram illustrating a delay on a beginning portion of a data transmission in accordance with an example embodiment.

While a delay is imposed on the beginning of the data transmission, in an example embodiment, no restriction is imposed on the portion of the data transmission (e.g., PDSCH) starting from a later portion of the data transmission timeline. FIG. 8 is a diagram illustrating a delay on a beginning portion of a data transmission in accordance with an example embodiment. Here, demodulation and decoding of a first portion 800 of a control transmission region 802 is performed first, which is finished at time 804, while demodulation and decoding of a second portion 806 of the control transmission region 802 is performed second, which is finished at time 808. The data transmission begins at time 810; however, scheduling restrictions are applied to transmission time interval ($TTI_1$) 812, thus causing beamforming of $TTI_1$ to utilize default parameters (described in more detail below). For $TTI_2$ 814, since the second portion 806 of the control transmission region 802 is demodulated and decoded at time 808, the beamforming of $TTI_2$ at time 816 may be performed using actual parameters gleaned from the demodulated and decoded second portion 806. There are no scheduling restrictions applied to the rest of the data transmission region 818.

Figure 9:
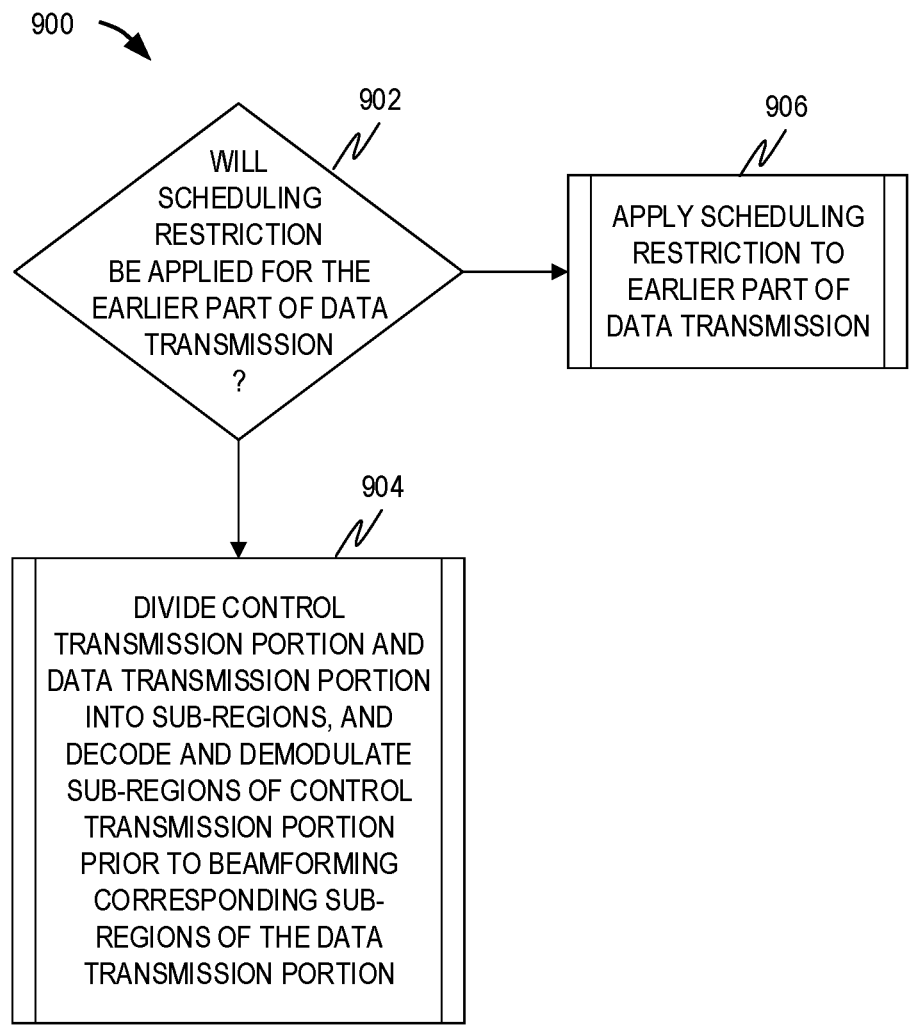
FIG. 9 is a flow diagram illustrating a method for handling an incoming data transmission in mmWave communication in accordance with an example embodiment.

In an example embodiment, a combination of the features described above with respect to both FIGS. 7 and 8 are used. FIG. 9 is a flow diagram illustrating a method 900 for handling an incoming data transmission in mmWave communication in accordance with an example embodiment. The mmWave communication may include a control transmission portion and a data transmission portion. At operation 902, it is determined whether a scheduling restriction should be applied for the earlier part of the data transmission. If not, then at operation 904 the processes described above with respect to FIG. 7 are used; specifically, the control transmission portion and the data transmission portion are divided into sub-regions, and decoding and demodulation of the sub-regions of the control transmission portion are performed prior to the beamforming of corresponding sub-regions of the data transmission portion. If at operation 902 it is determined that a scheduling restriction should be applied for the earlier part of the data transmission, then at operation 906 a scheduling restriction is applied to an earlier part of the data transmission.

Figure 10:
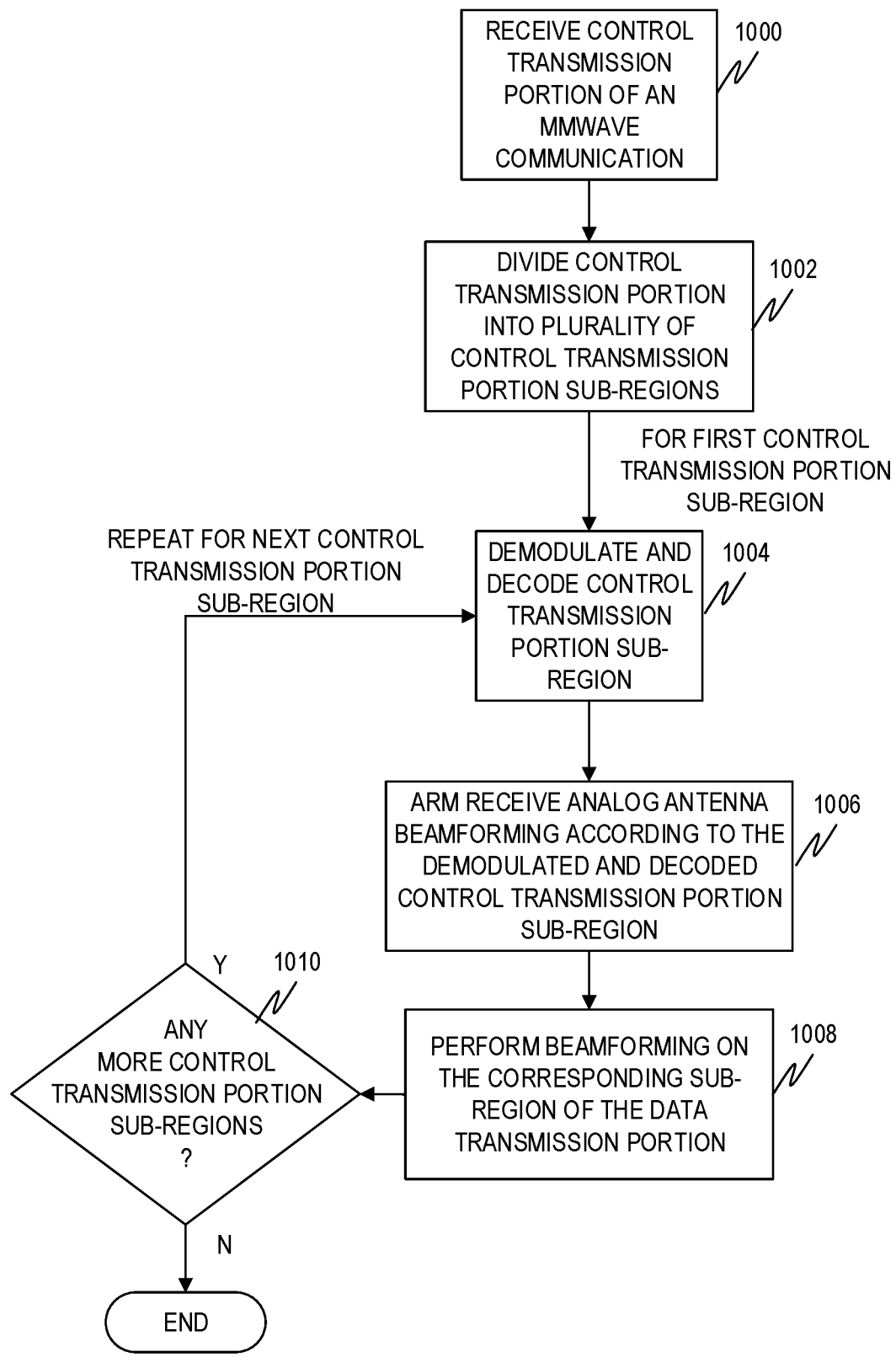
FIG. 10 is a flow diagram illustrating dividing a control transmission portion and a data transmission portion into sub-regions in more detail in accordance with an example embodiment.

FIG. 10 is a flow diagram illustrating dividing a control transmission portion and a data transmission portion into sub-regions (operation 904 of FIG. 9) in more detail in accordance with an example embodiment. At operation 1000, a control transmission portion of an mmWave communication is received. At operation 1002, the control transmission portion is divided into a plurality of control transmission portion sub-regions, each sub-region scheduling a data transmission for a corresponding sub-region of a data transmission portion. Then a loop is begun for each control transmission portion sub-region. At operation 1004, a UE demodulates and decodes the control transmission portion sub-region. At operation 1006, the UE arms receive analog antenna beamforming according to the demodulated and decoded control transmission portion sub-region. At operation 1008, the UE performs receive beamforming on a corresponding sub-region of the data transmission portion. At operation 1010, it is determined if there are any more control transmission portion sub-regions. If so, then the process loops to operation 1004 for the next control transmission portion sub-region. If not, then the process ends.

It should be noted that aspects of each execution of the loop may be performed in parallel, and thus it is not necessary that the operations 1004-1010 be performed exactly in strict serial order as depicted. For example, while the UE is performing operations 1006 and 1008 for one control transmission portion sub-region, it may simultaneously be performing (or may have already performed) operation 1004 for a subsequent control transmission portion sub-region.

Figure 11:
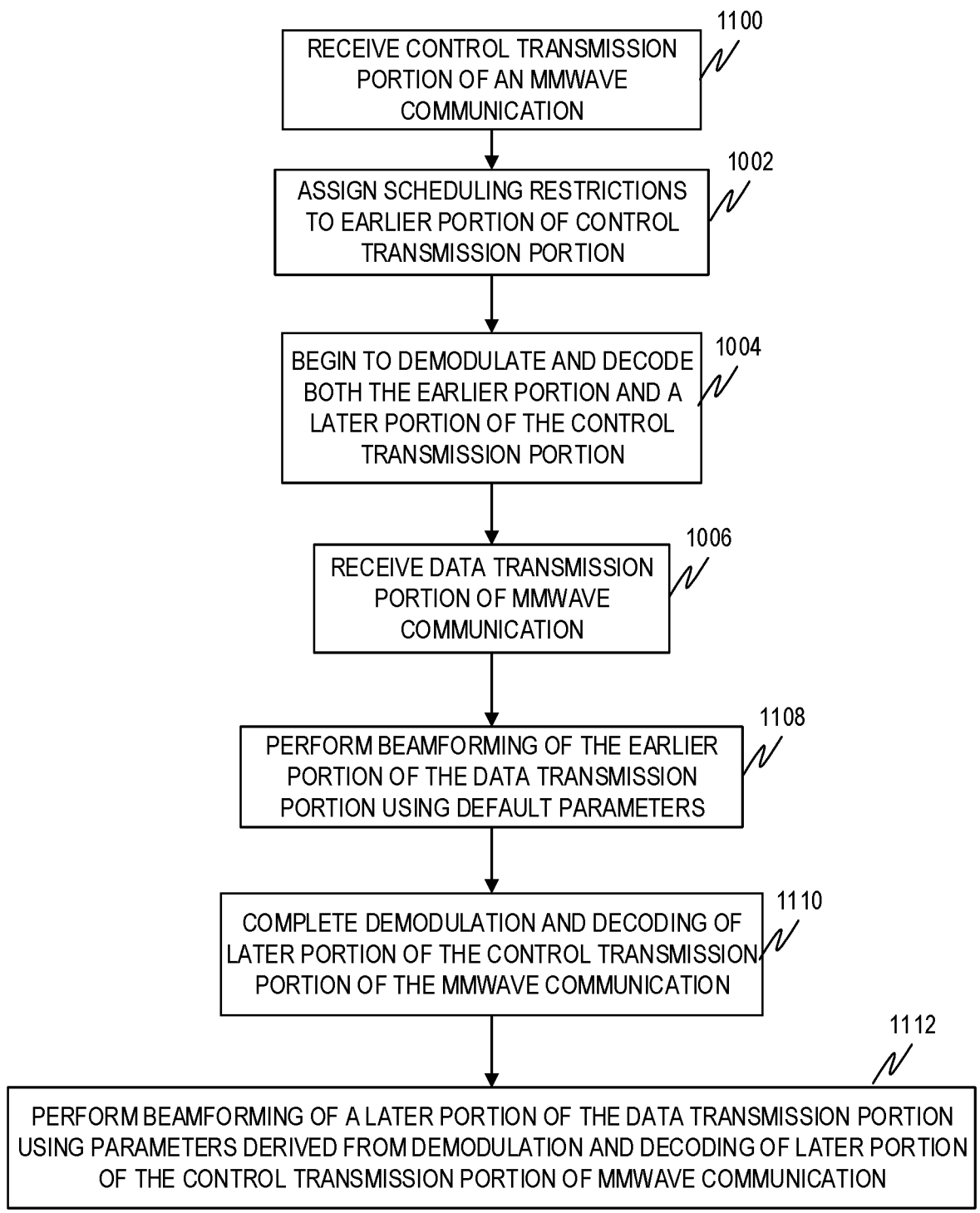
FIG. 11 is a flow diagram illustrating applying a scheduling restriction to an earlier part of a data transmission in more detail in accordance with an example embodiment.

FIG. 11 is a flow diagram illustrating applying a scheduling restriction to an earlier part of a data transmission portion (operation 906 of FIG. 9) in more detail in accordance with an example embodiment. At operation 1100, a control transmission portion of an mmWave communication is received. At operation 1102, scheduling restrictions may be assigned to an earlier portion of the control transmission portion. These scheduling restrictions may indicate a delay time for beamforming to be performed on a corresponding earlier portion of a data transmission portion. At operation 1104, demodulation and decoding of both the earlier portion and a later portion of the control transmission portion is begun. At operation 1106, a data transmission portion of the mmWave communication is received. At operation 1108, beamforming of the earlier portion of the data transmission portion is performed using default parameters, because this earlier portion of the data transmission portion is subject to the scheduling restrictions of the corresponding earlier portion of the control transmission portion. These parameters may correspond, for example, to the UE's last reported parameters for the beamforming. At operation 1110, demodulation and decoding of the later portion of the control transmission portion of the mmWave communication is completed. At operation 1112, beamforming of a later portion of the data transmission portion is performed using parameters derived from the demodulation and decoding of the later portion of the control transmission portion of the mmWave communication.

The decision as to which portions of the data transmission portion to classify as the "earlier portion" (and thus apply the delay to) may be based on actual performance of the UE in the demodulating and decoding. For example, performance metrics of the UE may be tracked to determine the average amount of time it takes to demodulate and decode a portion of the control transmission portion. The delineation between the earlier portion (delayed) and the later portion (not delayed) may then be set based on this average amount of time (with some padding, perhaps) to ensure that the later portion of the data transmission portion is beamformed using parameters from information of the demodulated and decoded corresponding control transmission portion, while minimizing the amount of the data transmission portion that is classified as an earlier portion (and thus subject to default parameters during beamforming). Referring back to FIG. 8, as can be seen, any TTI scheduled to be beamformed after time 808 may have no scheduling restrictions applied to it. Time 808 may be determined, as described above, a priori based on average demodulation and decoding times. Alternatively, time 808 may be dynamically determined at runtime, such that when it is determined that a particular portion of the control transmission portion has been demodulated and decoded, the corresponding portion of the data transmission portion is beamformed without the scheduling restrictions, and any subsequent portions of the data transmission portion are also beamformed without the scheduling restrictions.

The following figures are diagrams of a processing system that may be used for implementing the devices and methods disclosed herein. Specific devices may utilize all of the components shown, or only a subset of the components, and levels of integration may vary from device to device.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-11 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 12:
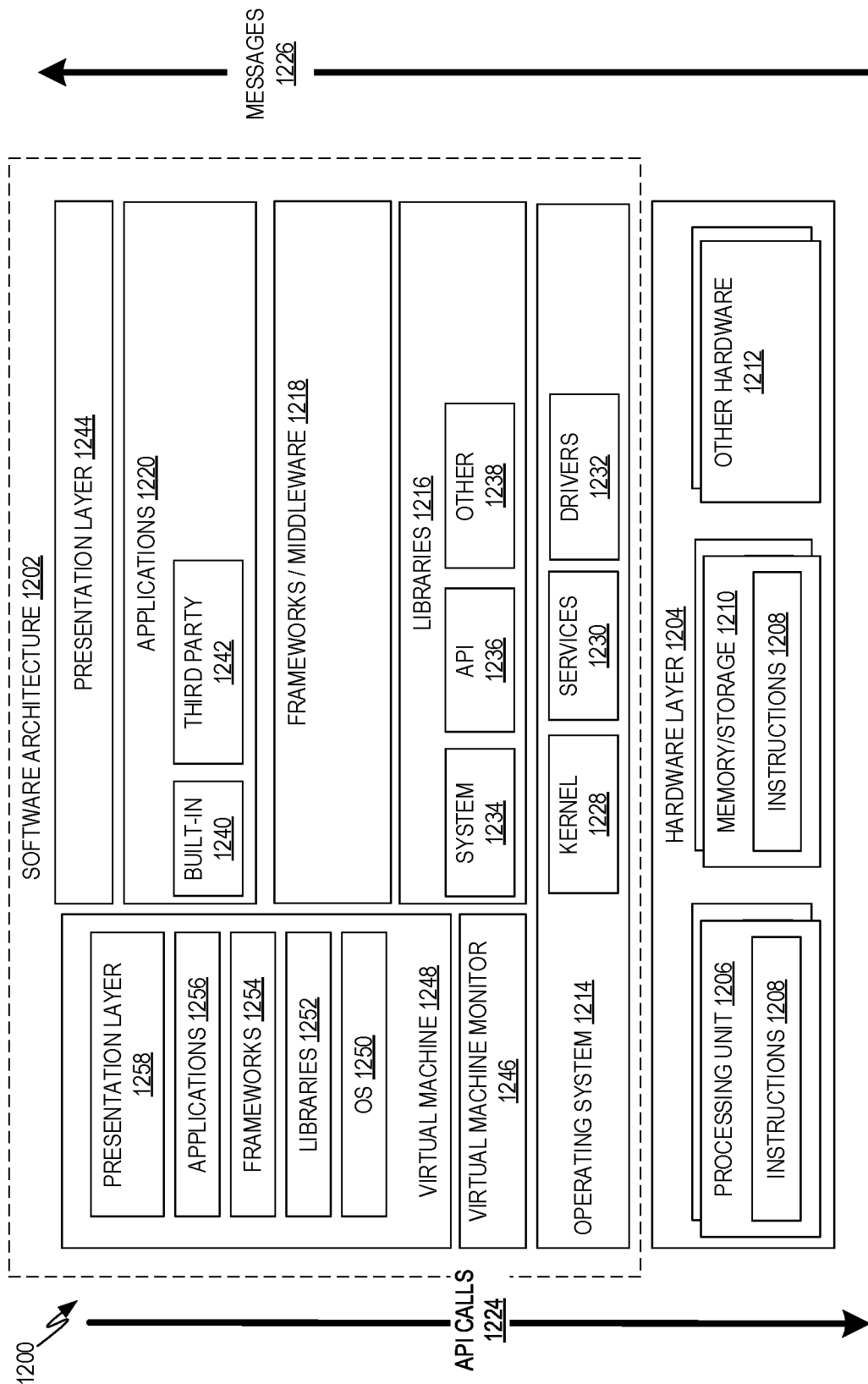
FIG. 12 is a block diagram illustrating a representative software architecture, which may be used in conjunction with various hardware architectures herein described.

FIG. 12 is a block diagram 1200 illustrating a representative software architecture 1202, which may be used in conjunction with various hardware architectures herein described. FIG. 12 is merely a non-limiting example of a software architecture 1202 and it will be appreciated that many other architectures may be implemented to facilitate the functionality described herein. The software architecture 1202 may be executing on hardware such as machine 1300 of FIG. 13 that includes, among other things, processors 1310, memory/storage 1330, and I/O components 1350. A representative hardware layer 1204 is illustrated and can represent, for example, the machine 1300 of FIG. 13. The representative hardware layer 1204 comprises one or more processing units 1206 having associated executable instructions 1208. Executable instructions 1208 represent the executable instructions of the software architecture 1202, including implementation of the methods, modules and so forth of FIGS. 1-9. Hardware layer 1204 also includes memory and/or storage modules 1210, which also have executable instructions 1208. Hardware layer 1204 may also comprise other hardware 1212, which represents any other hardware of the hardware layer 1204, such as the other hardware illustrated as part of machine 1300.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220 and presentation layer 1244. Operationally, the applications 1220 and/or other components within the layers may invoke application programming interface (API) calls 1224 through the software stack and receive a response, returned values, and so forth illustrated as messages 1226 in response to the API calls 1224. The layers illustrated are representative in nature and not all software architectures 1202 have all layers. For example, some mobile or special purpose operating systems may not provide a frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks/middleware 1218 (also sometimes referred to as middleware) may provide a higher-level common infrastructure that may be utilized by the applications 1220 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1220 and/or other software components/modules, some of which may be specific to a particular operating system 1214 or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1242 may invoke the API calls 1224 provided by the mobile operating system such as operating system 1214 to facilitate functionality described herein.

The applications 1220 may utilize built-in operating system functions (e.g., kernel 1228, services 1230 and/or drivers 1232), libraries (e.g., system libraries 1234, API libraries 1236, and other libraries 1238), and frameworks/middleware 1218 to create user interfaces to interact with users of the system. Alternatively, or additionally, in some systems, interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware machine (such as the machine 1300 of FIG. 13, for example). A virtual machine 1248 is hosted by a host operating system (operating system 1214 in FIG. 12) and typically, although not always, has a virtual machine monitor 1246, which manages the operation of the virtual machine 1248 as well as the interface with the host operating system (i.e., operating system 1214). A software architecture 1202 executes within the virtual machine 1248 such as an operating system 1250, libraries 1252, frameworks/middleware 1254, applications 1256 and/or presentation layer 1258. These layers of software architecture executing within the virtual machine 1248 can be the same as corresponding layers previously described or may be different.

Example Machine Architecture and Machine-Readable Medium

Figure 13:
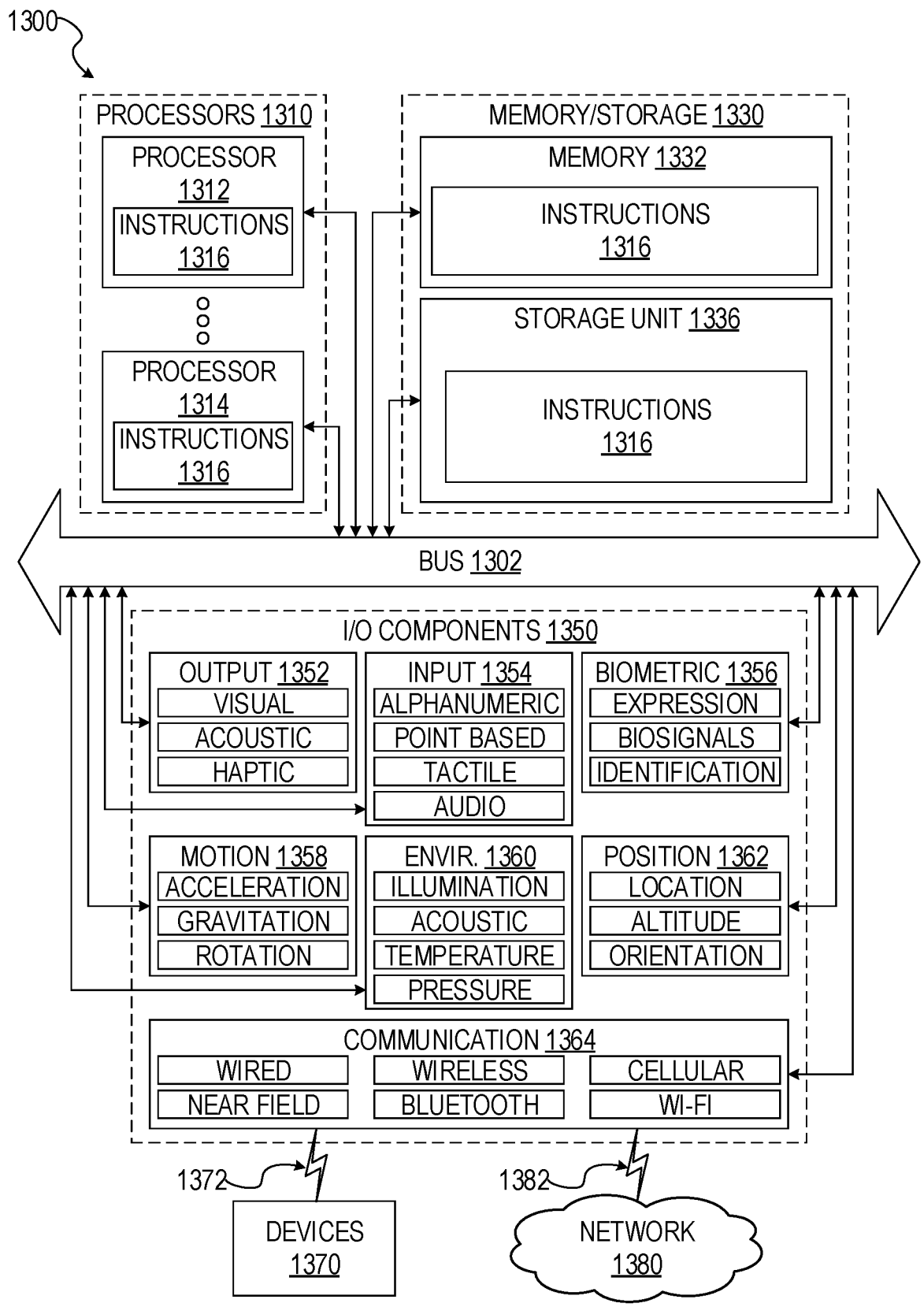
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions 1316 from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute the flow diagrams of FIGS. 9 and 10. Additionally, or alternatively, the instructions 1316 may implement modules of FIGS. 1-11, and so forth. The instructions 1316 transform the general, non-programmed machine 1300 into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1312 and processor 1314 that may execute instructions 1316. The term "processor" is intended to include multi-core processor 1312, 1314 that may comprise two or more independent processors 1312, 1314 (sometimes referred to as "cores") that may execute instructions 1316 contemporaneously. Although FIG. 13 shows multiple processors 1310, the machine 1300 may include a single processor 1312, 1314 with a single core, a single processor 1312, 1314 with multiple cores (e.g., a multi-core processor 1312, 1314), multiple processors 1312, 1314 with a single core, multiple processors 1312, 1314 with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within at least one of the processors 1310 (e.g., within the processor 1312, 1314's cache memory), or any suitable combination thereof, during execution thereof by the machine 1300. Accordingly, the memory 1332, the storage unit 1336, and the memory of processors 1310 are examples of machine-readable media.

As used herein, "machine-readable medium" means a device able to store instructions 1316 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine 1300 will depend on the type of machine 1300. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1392 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A communication method comprising:
  receiving, by a user equipment (UE), downlink control information in a physical downlink control channel (PDCCH) in accordance with a beamforming parameter of the PDCCH;
  receiving, by the UE, data in a physical downlink shared channel (PDSCH) based on the beamforming parameter of the PDCCH upon determining at least that a time offset between the downlink control information in the PDCCH and the data in the PDSCH is less than a time duration associated with a UE demodulating and decoding capability;
  performing, by the UE, a demodulation and decoding operation on the downlink control information received over the PDCCH, the data being received in the PDSCH based on the beamforming parameter of the PDCCH prior to the UE completing the demodulation and decoding operation on the downlink control information received in the PDCCH; and
  decoding, by the UE, the data received in the PDSCH based on the downlink control information received in the PDCCH.

2. The method according to claim 1, wherein the beamforming parameter is an analog receive beamforming parameter.

3. The method according to claim 1, wherein the data received over the PDSCH is a millimeter wave communication.

4. The method of claim 1, wherein the data in the PDSCH is received based on the beamforming parameter of PDCCH upon the UE determining both that the data in the PDSCH is subject to a scheduling restriction and that the time offset between the downlink control information in the PDCCH and the data in the PDSCH is less than the time duration associated with the UE demodulating and decoding capability.

5. A user equipment (UE) comprising:
  a processor; and
  a non-transitory computer readable storage medium storing programming for execution by the processor, the programming including instructions to:
  receive downlink control information in a physical downlink control channel (PDCCH) in accordance with a beamforming parameter of the PDCCH;
  receive data in the physical downlink shared channel (PDSCH) based on the beamforming parameter of the PDCCH upon determining at least that a time offset between the downlink control information in the PDCCH and the data in the PDSCH is less than a time duration associated with a UE demodulating and decoding capability;

perform a demodulation and decoding operation on the downlink control information received over the PDCCH, the data being received in the PDSCH based on the beamforming parameter of the PDCCH prior to the UE completing the demodulation and decoding operation on the downlink control information received in the PDCCH; and decode the data received in the PDSCH based on the downlink control information received in the PDCCH.

6. The UE according to claim 5, wherein the beamforming parameter is an analog receive beamforming parameter.

7. The UE according to claim 5, wherein the data received over the PDSCH is a millimeter wave communication.

8. The UE according to claim 5, wherein the data in the PDSCH is received based on the beamforming parameter of PDCCH upon the UE determining both that the data in the PDSCH is subject to a scheduling restriction and that the time offset between the downlink control information in the PDCCH and the data in the PDSCH is less than the time duration associated with the UE demodulating and decoding capability.

9. A method comprising:

receiving, by a user equipment (UE), downlink control information in a physical downlink control channel (PDCCH), the downlink control information including an indicator that identifies an analog receive beamforming parameter;

receiving, by the UE, data in a physical downlink shared channel (PDSCH) based on the analog receive beamforming parameter indicated by the downlink control information received over the PDCCH upon determining that a time offset between the downlink control information in the PDCCH and the data in the PDSCH is greater than or equal to a time duration associated with a UE demodulating and decoding capability;

performing, by the UE, a demodulation and decoding operation on the downlink control information received over the PDCCH, the data being received in the PDSCH based on the analog receive beamforming parameter of the PDCCH prior to the UE completing the demodulation and decoding operation on the downlink control information received in the PDCCH; and decoding, by the UE, the data received in the PDSCH based on the downlink control information received in the PDCCH.

10. The method according to claim 8, wherein the data received over the PDSCH is a millimeter wave communication.

11. A user equipment (UE) comprising:

a processor; and a non-transitory computer readable storage medium storing programming for execution by the processor, the programming including instructions to:

receive downlink control information in a physical downlink control channel (PDCCH), the downlink control information including an indicator that identifies an analog receive beamforming parameter;

receive data in a physical downlink shared channel (PDSCH) based on the analog receive beamforming parameter indicated by the downlink control information received over the PDCCH upon determining that a time offset between the downlink control information in the PDCCH and the data in the PDSCH is greater than or equal to a time duration associated with a UE demodulating and decoding capability;

perform a demodulation and decoding operation on the downlink control information received over the PDCCH, the data being received in the PDSCH based on the analog receive beamforming parameter of the PDCCH prior to the UE completing the demodulation and decoding operation on the downlink control information received in the PDCCH; and decode the data received in the PDSCH based on the downlink control information received in the PDCCH.

12. The UE according to claim 11, wherein the data received over the PDSCH is a millimeter wave communication.

* * * * *